United States Patent [19]

Fuchs

[11] 4,397,026
[45] Aug. 2, 1983

[54] APPARATUS FOR CONNECTING A GRAPHITE ELECTRODE TO A PERMANENT ELECTRODE IN AN ELECTRIC FURNACE

[75] Inventor: Gerhard Fuchs, Kehl-Bodersweier, Fed. Rep. of Germany

[73] Assignee: Korf & Fuchs Systemtechnik GmbH, Willstätt-Legelshurst, Fed. Rep. of Germany

[21] Appl. No.: 396,322

[22] Filed: Jul. 8, 1982

[30] Foreign Application Priority Data

Jul. 28, 1981 [DE] Fed. Rep. of Germany ....... 3129602

[51] Int. Cl.³ .............................................. H05B 7/14
[52] U.S. Cl. ......................................... 373/92; 373/93
[58] Field of Search ............................. 373/91, 92, 93

[56] References Cited

U.S. PATENT DOCUMENTS

| 3,795,753 | 3/1974 | Mori et al. | 373/92 |
| 3,937,867 | 2/1976 | Wynne | 373/92 |
| 4,044,199 | 8/1977 | Simon | 373/92 |

FOREIGN PATENT DOCUMENTS

| 2312968 | 10/1973 | Fed. Rep. of Germany | 373/92 |
| 578473 | 7/1946 | United Kingdom | 373/92 |
| 655095 | 3/1979 | U.S.S.R. | 373/92 |

Primary Examiner—Roy N. Envall, Jr.

[57] ABSTRACT

Apparatus for disconnecting a residual portion of a consumed graphite electrode from a permanent electrode which has been lifted out of an electric furnace and which may still be hot, and for connecting a fresh graphite electrode portion to the permanent electrode, comprises a housing for surrounding the electrode assembly in the region of a screw nipple on the permanent electrode. Disposed in the upper region of the housing is an upper clamping means for holding the permanent electrode, while disposed in the lower region of the housing is a lower clamping means which can produce a screwing movement for unscrewing and screwing on the graphite electrode portion. The housing is of a double-walled construction to provide for water cooling thereof.

18 Claims, 11 Drawing Figures

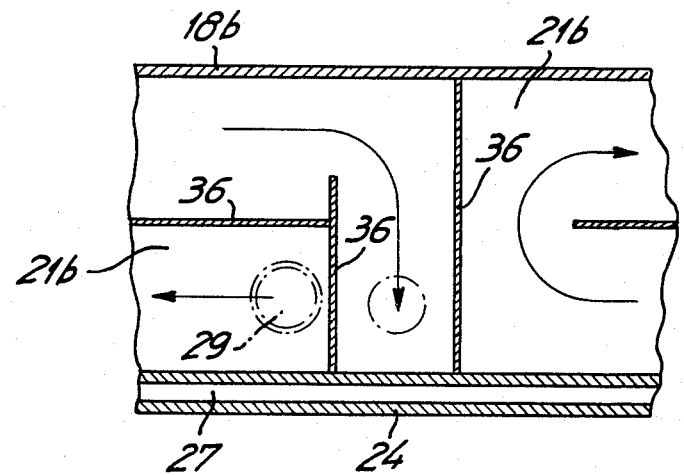
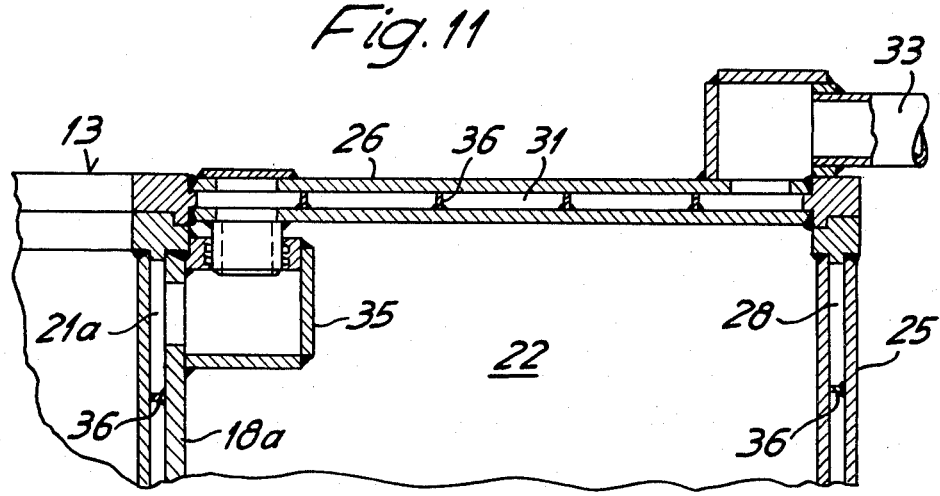

APPARATUS FOR CONNECTING A GRAPHITE ELECTRODE TO A PERMANENT ELECTRODE IN AN ELECTRIC FURNACE

BACKGROUND OF THE INVENTION

The invention relates generally to an apparatus for connecting a graphite electrode to a permanent electrode in an electric furnace, the graphite electrode and the permanent electrode together forming the actual electrode of the electric furnace. The electrode can therefore also be referred to as a composite electrode.

Conventional electric furnaces use graphite electrodes which comprise at least two portions which are screwed together in axial succession by means of screw nipples comprising carbon or graphite. The electrodes pass upwardly through the cover of the furnace and are suitably supported by a holding arrangement disposed above the cover of the furnace. The electrodes can be moved downwardly out of the holding arrangement into the furnace with a stepwise motion, as the electrodes are burnt away.

After the electrode has been reduced in length in this manner, a fresh electrode portion must be screwed on to the upper end of the graphite electrode which is held in a clamping device, the screw connection being formed by means of a carbon or graphite nipple which is screwed on to the graphite electrode. As a conventional portion, as referred to above, of an electrode comprised of graphite, carbon or the like, is several meters in length, for use in the electric furnaces which are conventionally employed nowadays, and is of considerable weight, various forms of nipple connecting arrangements have already been proposed for carrying out the above-indicated operation of connecting the graphite electrode and the fresh electrode portion by means of a nipple connection, from above (see for example DE-A No 23 12 968), such devices being used to screw a fresh electrode portion or section to the graphite electrode which is held in a clamped condition, above the electric furnace.

However, an unsatisfactory consideration in the above-indicated conventional furnaces is that the electrodes which are made up of a number of electrode portions or sections tend to suffer comparatively severely from erosion and breakage, and electrode breakages cause not inconsiderable amounts of material and time to be lost. For that reason, it has been suggested in fairly recent times (see for example DE-A No 27 39 483) that the end of the electrode which projects upwardly out of the electric furnace and which is held in the support arrangement and which is connected at the top to a current source should be made in the form of a permanent or continuous electrode comprising copper or a metal which is a similarly good conductor, with the permanent or continuous electrode being cooled by a coolant, for example a water circuit. The term permanent electrode is used in this specification to indicate an arrangement of the kind just described. In such an arrangement, the lower end of the permanent electrode, which projects into the electric furnace, is in the form of a screw nipple so that a portion or section of a conventional graphite electride then only needs to be screwed to the screw nipple to make up an electrode. The mere fact that the upper portion or section of the electrode which is gripped in the support device is of metal results in a substantial reduction in the risk of erosion and breakage. However, there is the disadvantage in comparison with the previously conventional graphite electrodes that the operation of connecting the graphite electrode to the permanent electrode by means of a nipple connecting means can no longer be carried out from above, so that the known nipple connecting devices also cannot be used. As moreover the lower end of the electrode retains its very high temperatures during the short period of time involved in changing a furnace charge, hitherto no possibility has been seen of connecting a fresh graphite electrode section to a permanent electrode which has been in use immediately before the connecting operation, for example during the short period of time involved in changing a furnace charge. On the contrary, the permanent electrode which had been in use prior to the change of graphite electrode section had to be disconnected from the current and coolant connections, and removed from the support arrangement, and a second permanent electrode which, while cold, had already been provided with a graphite electrode connected thereto by a nipple connection had to be fitted into the support means to be clamped thereby, and connected to the coolant circuit and the current supply. The permanent electrode which had been used previously could then be provided with a fresh electrode section after it had cooled down, during the next period of operation of the furnace, and the remaining portion of electrode which had been previously removed from the permanent electrode and which had not yet been fully consumed could then be re-connected to the fresh electrode portion, at the lower end thereof, by means of a conventional screw nipple comprising graphite. Even if simple devices are available for fitting and removing electrode portions to and from the permanent electrode it has cooled, nonetheless the above-described operation involves disadvantages which run counter to and detract from the advantage of using the permanent electrode.

SUMMARY OF THE INVENTION

An object of the present invention is to provide an apparatus for connecting a graphite electrode to a permanent electrode from below.

A further object of the present invention is to provide an apparatus for connecting a graphite electrode to a permanent electrode by means of a nipple-type connection, such that a remaining portion of graphite electrode can be unscrewed from a permanent electrode while it is still hot and while it is still connected to its coolant circuit, being supported in an associated support device directly after a period of operation of a furnace, so that a fresh graphite electrode section can be immediately connected to a permanent electrode, for example in the short period of time involved in a change of furnace charge.

Still another object of the present invention is to provide an apparatus for nipple-connecting a graphite electrode to a permanent electrode in an electric furnace, which involves a minimum time of cessation of operation of the furnace.

A further object of the present invention is to provide an apparatus for connecting a graphite electrode to a permanent electrode in a quick and easily operable manner.

Still a further object of the present invention is to provide such an apparatus for connecting a graphite electrode portion to a permanent electrode, which is provided with adequate cooling means to permit the electrode portion to be changed immediately after the electrode has been brought up out of the furnace.

A still further object of the present invention is to provide such an apparatus, which is of a substantially closed configuration such as to surround the location at which the connection is to be made between a permanent electrode and a graphite electrode section.

These and other objects are achieved by an apparatus for connecting a graphite electrode by a nipple connection from below to a permanent electrode which is axially displaceably supported by a carrier device of an electric furnace, the permanent electrode carrying a residual portion of a consumed graphite electrode which is connected to the permanent electrode by a lower screw connecting nipple. The apparatus comprises a housing which is disposed around the permanent electrode in the region of the screw connecting nipple and the adjoining portion of the graphite electrode. Disposed in the upper region of the housing is an upper clamping means for gripping the permanent electrode, while disposed in the lower region of the housing is a second lower clamping means which can be screwed through a total movement of more than one revolution, in an axial region such as to permit a graphite electrode to be unscrewed from and screwed to the nipple connection with the permanent electrode. The housing defines an axial space for receiving the electrode portions, having a cylindrical inside wall which is of a closed configuration, except for the necessary openings for the upper and lower clamping means, the inside wall being of a double-walled configuration and having the space defined between the double wall configuration connected to a coolant supply.

It will be seen therefore that the above-indicated apparatus in accordance with the principles of the present invention is suitable for connecting graphite electrodes to the lower end of a permanent electrode by means of a nipple connection, while the electrode is still hot. The apparatus according to the invention differs from the above-discussed prior apparatuses for connecting electrode portions from the top, not only by virtue of a different arrangement of clamping means as set forth above, but also by virtue of the fact that the apparatus according to the invention has a housing around the electrode, defining the axial space for receiving the electrode. The fact that the inside wall of the housing, which is substantially closed, is of a double-walled configuration and is cooled by means of a coolant means that the apparatus can be used to operate on an electrode which has only just been taken out of an electic furnace and which is still accordingly in a hot condition. In this connection, the housing carrying the apparatus can be fixedly arranged either on an intermediate frame structure or on an intermediate floor structure of a building, with a suitable opening for the graphite electrode, or alternatively the housing carrying the apparatus may also be fixed on a manipulator arrangement which also permits the position of the housing to be aligned relative to the permanent electrode.

In a particularly advantageous aspect of the present invention, the end and outer wall portions of the housing are also of a double-walled configuration and are also connected to a cooling system. Such a housing which is therefore cooled at all its wall portions not only provides for effective protection for the clamping means within the housing, from excessive temperature loading, but also gives welcome protection for the clamping means from dust and other fouling matter.

Other objects, features and advantages of the present invention will be apparent from the following description and other claims.

BRIEF DESCRIPTION OF THE DRAWINGS

FIG. 10 shows a view of part of the apparatus in section taken along line X—X in FIG. 8, with the apparatus being shown in a development in the peripheral direction, and FIG. 11 shows a view of part of the apparatus in section taken along line XI—XI in FIG. 8.

DESCRIPTION OF THE PREFERRED EMBODIMENT

Figure 1:
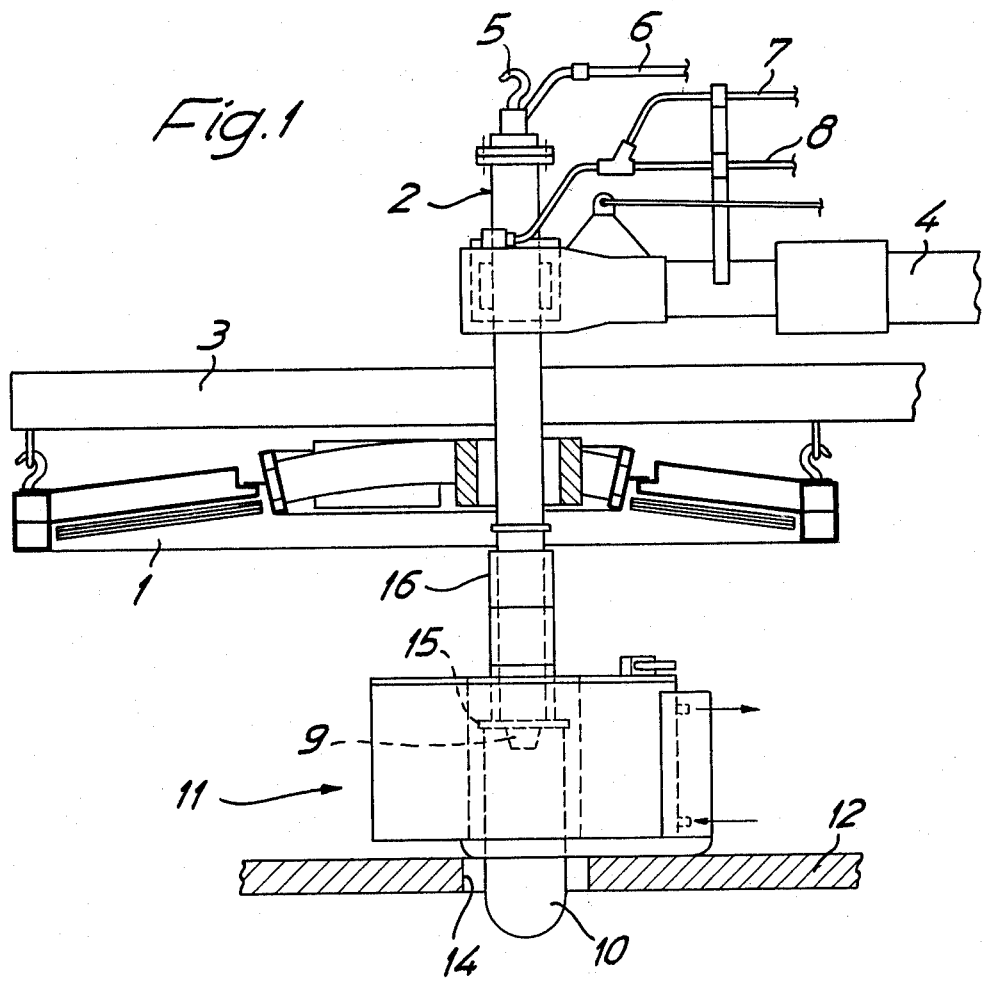
FIG. 1 shows a diagrammatic side view in partial section of a permanent electrode which is lifted out of an electric furnace, together with the cover thereof, and which carries a residual portion of a graphite electrode connected thereto by a nipple connection, said residual portion projecting into the housing of the apparatus in accordance with the present invention in such a way that the residual portion of graphite electrode can be removed and a fresh graphite electrode portion can be connected to the permanent electrode.

Referring firstly to FIG. 1, shown therein is a permanent electrode 2 which has been lifted out of an electric furnace (not shown), together with the cover 1 of the furnace. The cover 1 is carried on a cantilever arm 3 which can be swung out in the usual manner, while the permanent electrode 2 is held in a vertically downwardly hanging position on a carrier device 4. The permanent electrode 2 in its released position can also be displaced axially from a crane suspension or lifting means (not shown) engaging an upper hook 5.

At the upper end, the permanent electrode 2 is also connected to a cable 6 of a conventional current supply means, while the carrier device 4 is connected by means of conduits 7 and 8 to a cooling water circuit which in conventional manner also provides for internal cooling of the permanent electrode 2 which is made of copper or a similar metal of good conductivity.

The lower end of the permanent electrode 2 carries a screw nipple 9 which also comprises metal, and by means of which the permanent electrode 2 carries the residual part of a portion or section 10 of a graphite electrode which has been almost completely consumed in the preceding period of operation of the furnace and which is screwed to the screw nipple 9. The graphite electrode portion 10 projects into a nipple connecting apparatus 11 which, in the embodiment illustrated, rests on a floor 12 of a building or like structure (not shown). Axially below an annular housing 13 of the apparatus 13, the floor 12 has an opening 14 through which the electrode portion 10 can be removed in a downward direction, and replaced by a fresh electrode portion. The electrode portion 10 will be unscrewed for that purpose by means of the apparatus 11, in a manner to be described hereinafter. As shown in FIG. 1, a number of ceramic rings 16 which are disposed around the permanent electrode 2 are supported on an outside shoulder configuration 15 of the screw nipple 9, the ceramic rings providing thermal insulation in an outward direction, in respect of the electrode which is still hot from being previously used in the electric furnace.

Figure 3:
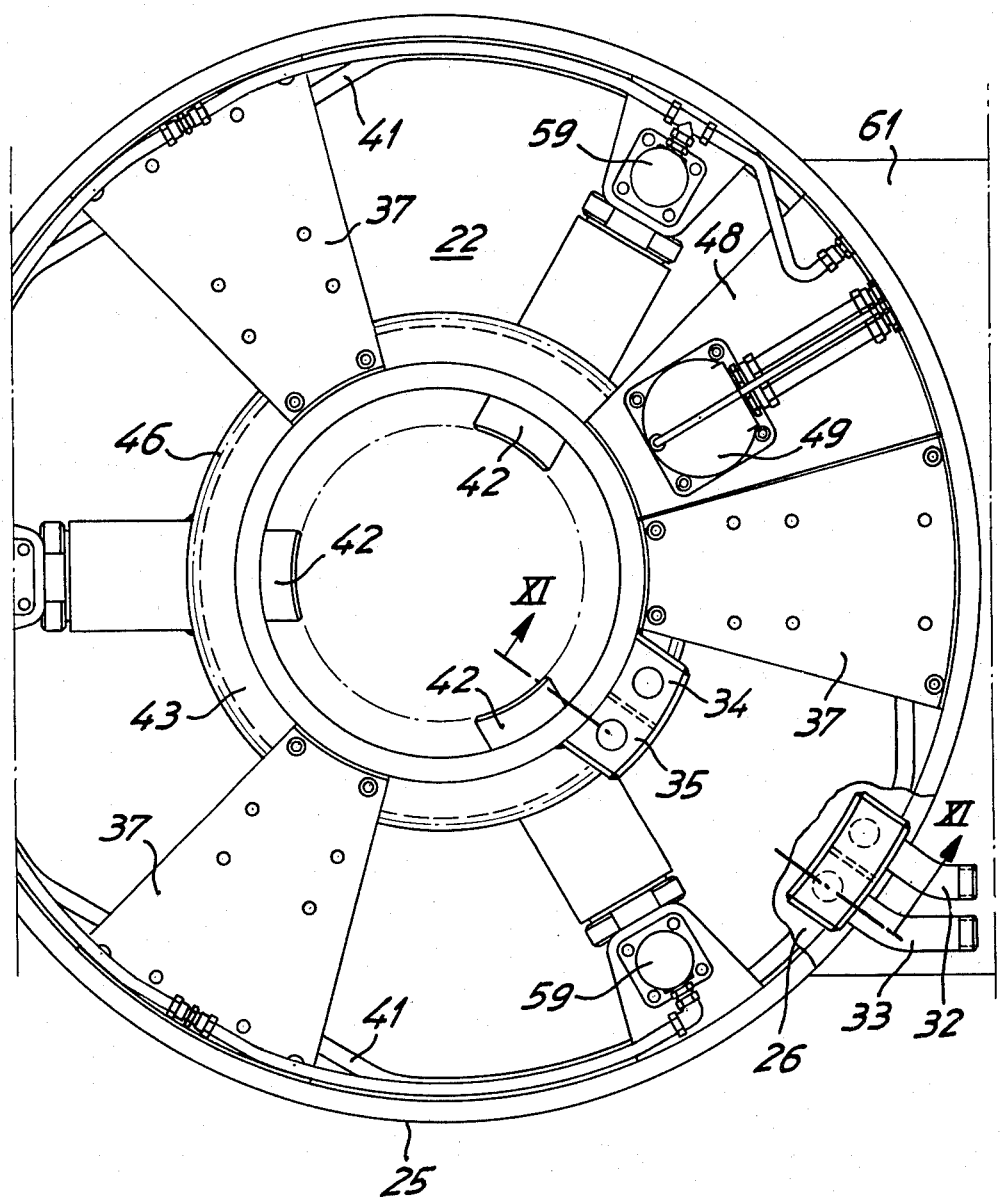
FIG. 3 shows a view corresponding to the view shown in FIG. 2 of the apparatus, with the cover removed, on an enlarged scale relative to the scale used in FIG. 2.
Figure 4:
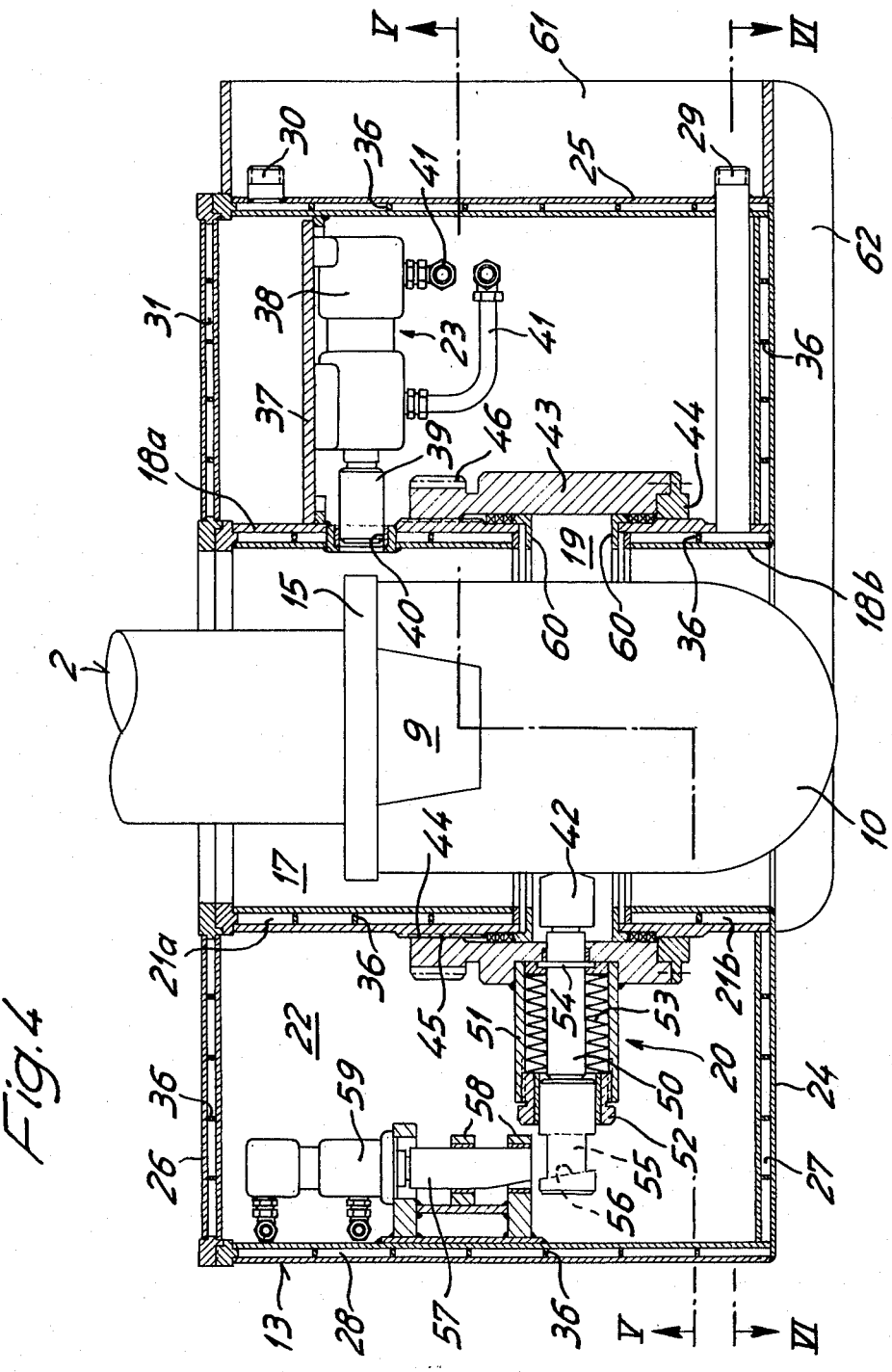
FIG. 4 shows the apparatus in longitudinal section taken along line IV—IV in FIG. 2, on the same scale as FIG. 3.
Figure 5:
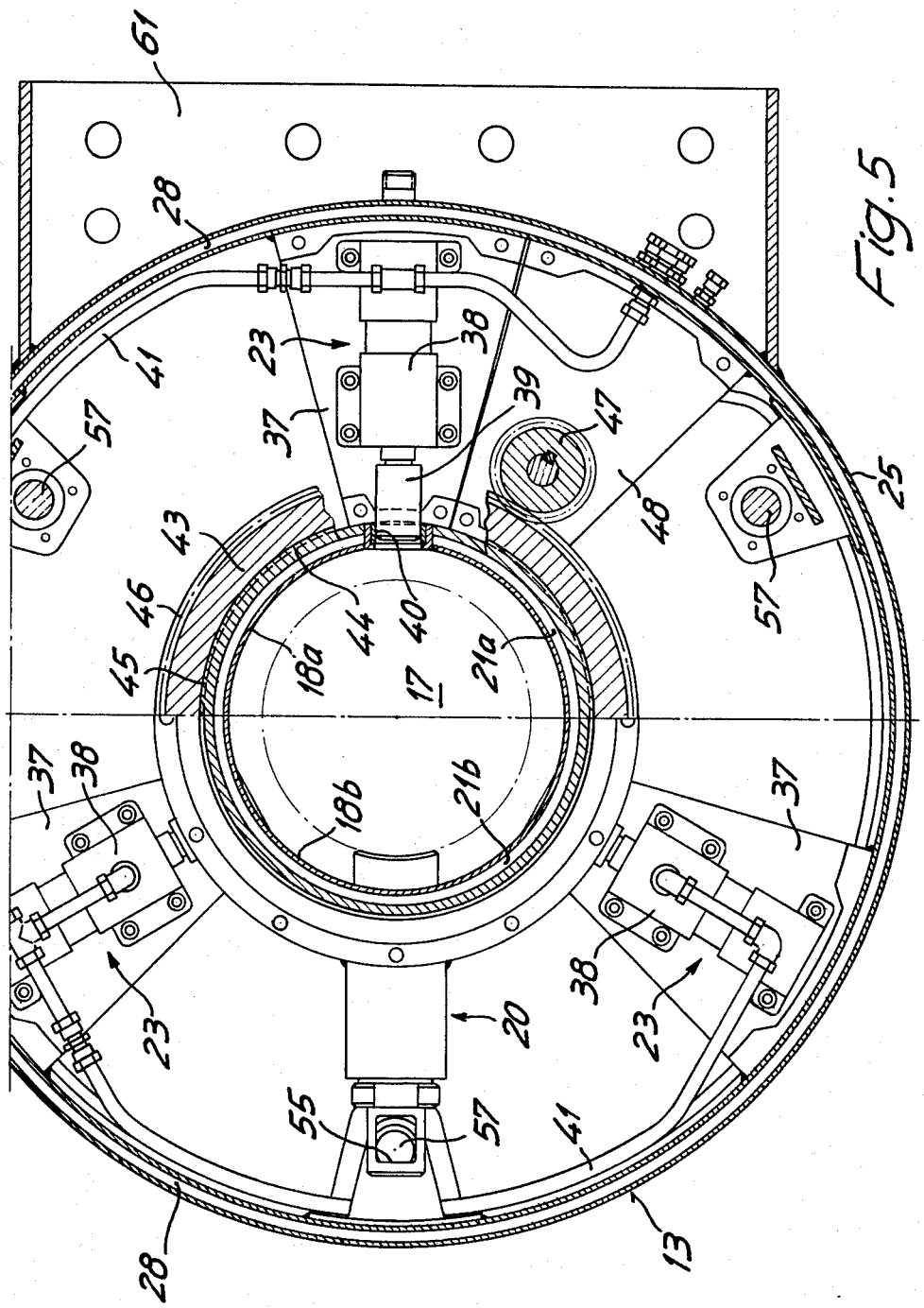
FIG. 5 shows a view of part of the apparatus in section taken along line V—V in FIG. 4, on the same scale.

As can be seen in particular from FIGS. 3 through 5, to which reference is now made, the housing 13 has a cylindrical inner wall which is disposed concentrically around the permanent electrode 2 together with the screw connection nipple 9, the outside shoulder 15 and the electrode portion 10 which are therefore disposed in a suitable opening 17. The inside wall of the housing 13 is divided into two axially successive and axially spaced wall portions 18a and 18b which define between them a gap or clearance 19 for receiving components of a lower clamping means 20, which will be described in greater detail hereinafter, for gripping a portion 10 of a graphite electrode. The wall portions 18a and 18b are both of a double-walled construction and the hollow spaces 21a and 21b formed therein each form a part of a coolant water circuit which will be described hereinafter.

Figure 2:
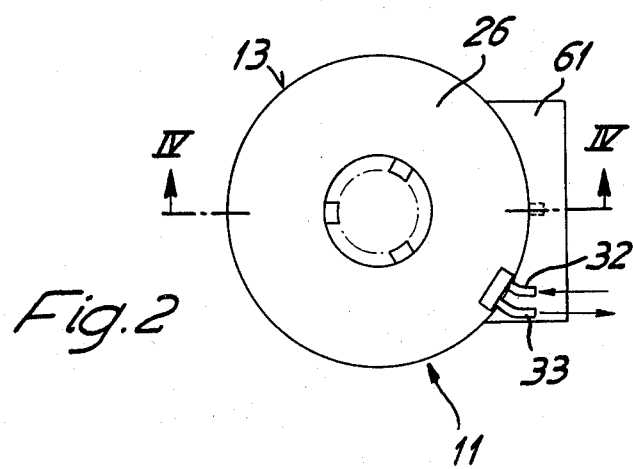
FIG. 2 shows a plan view of the apparatus according to the invention as shown in FIG. 1.

As will be seen from FIGS. 3 through 5, the lower clamping means 20 is disposed in the annular space 22 which is defined around the inner wall 18a and 18b of the annular housing 13. Also disposed in the annular space 22 is an upper clamping means 23, to which further reference will be made below. As will be seen more particularly from FIG. 4, all further wall portions of the housing 13, namely an annular bottom portion 24, a cylindrical outer wall 25 and an annular cover 26 on the housing 13 are of a double-walled configuration, thus providing a jacket arrangement. As will be described in greater detail hereinafter, the hollow spaces 27 and 28 defined by the double wlall structure of the bottom portion 24 and the outer wall 25, jointly with the hollow space 21b defined by the lower portion 18b of the inner wall are connected in a manner which will be described in greater detail hereinafter to a feed connection 29 and a discharge connection 30 of a first coolant water circuit (the remainder of the circuit, outside the connections 29 and 30, is not shown), while the hollow space 31 defined in the cover 26, jointly with the hollow space 21a defined in the upper portion 18a of the inner wall of the housing 13 are connected, in a manner which will also be described hereinafter, to a feed connection 32 and a discharge connection 33 of a second coolant water circuit. The two connections 32 and 33 are arranged on the cover 26 of the housing 13, as will be seen in particular from FIGS. 1 through 3. In addition, the housing 26 is fluid-tightly screwed to the downwardly adjoining wall portions by screw means (not shown) which are distributed along the outside periphery and the inside periphery of the annular cover 26, in such a way that the two clamping means 20 and 23 are normally virtually fluid-tightly sealed relative to the exterior, but if desired are also accessible, after removing the cover 26.

Figure 6:
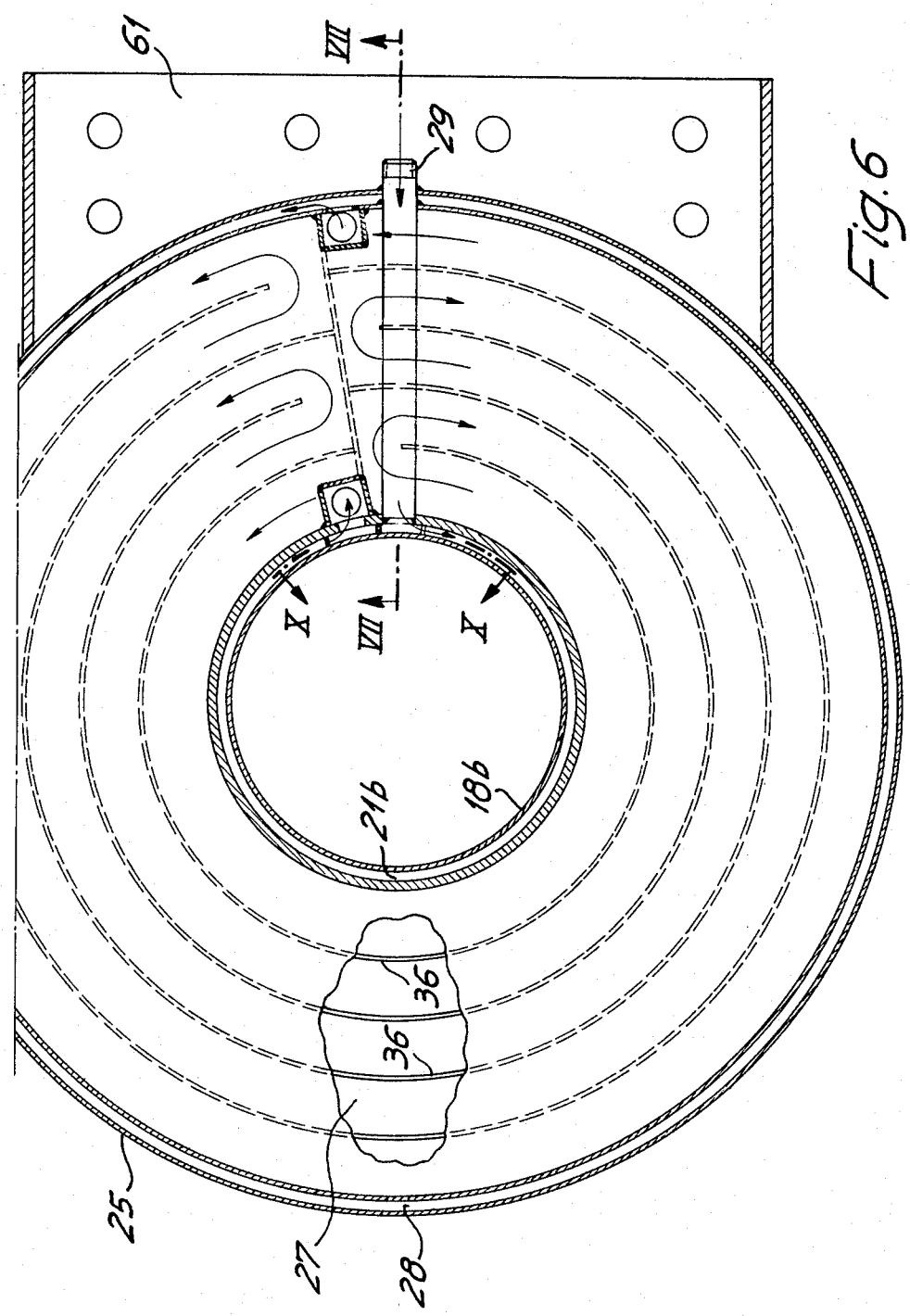
FIG. 6 shows a view of part of the apparatus in section taken along line VI—VI in FIG. 4, on the same scale.
Figure 7:
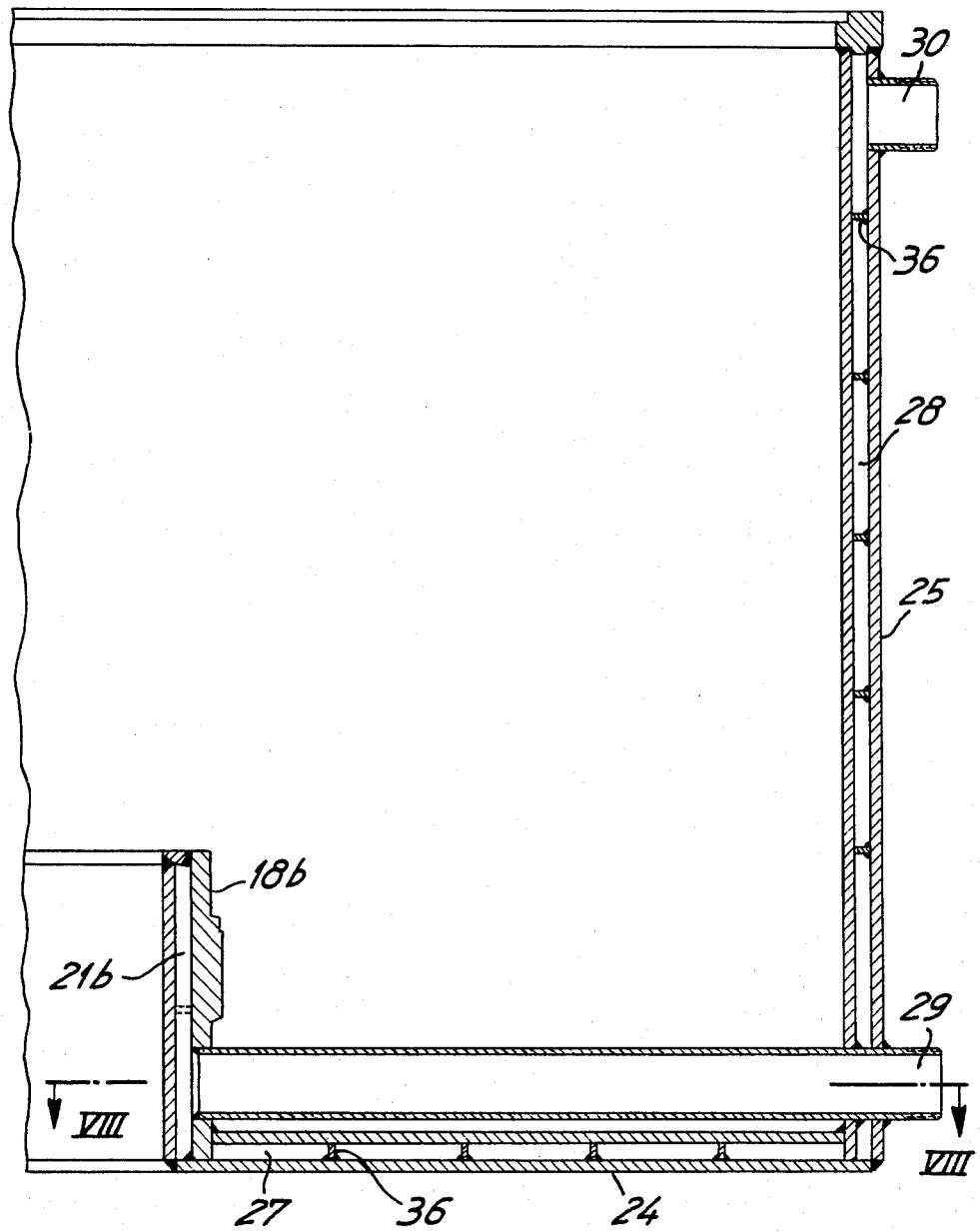
FIG. 7 shows a view of part of the apparatus taken along line VII—VII in FIG. 6, on the same scale.
Figure 8:
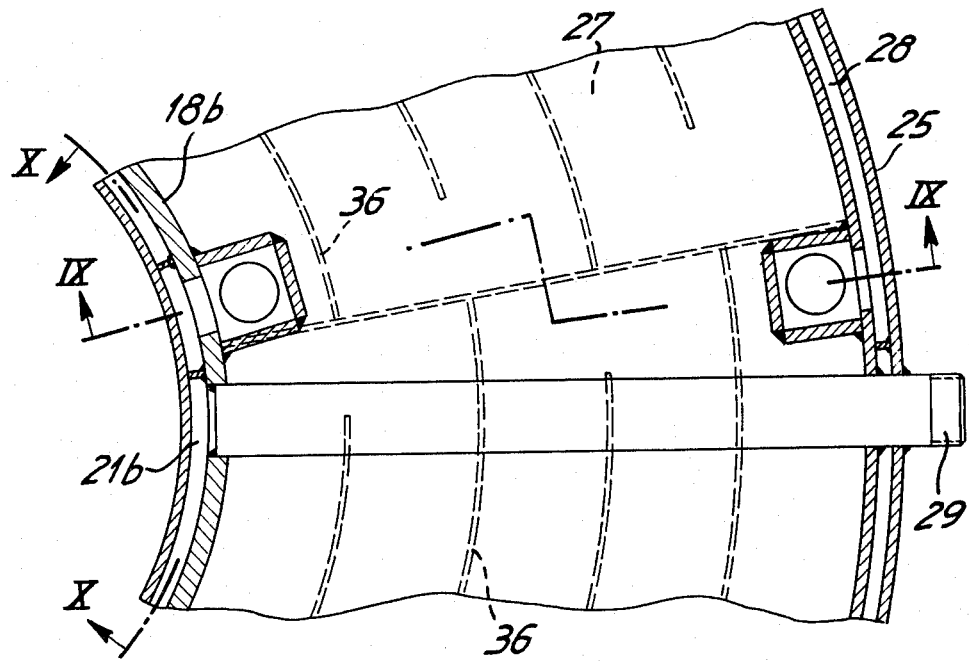
FIG. 8 shows a view of part of the apparatus in section taken along line VIII—VIII in FIG. 7.
Figure 9:
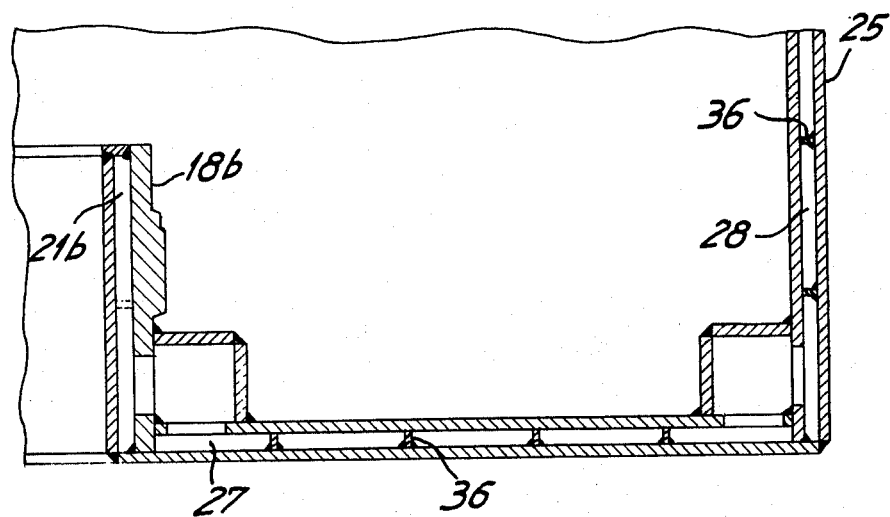
FIG. 9 shows a view of part of the apparatus in section taken along line IX—IX in FIG. 8.

As will be seen from FIGS. 4, 6 and 7 to which reference is therefore now made, the cooling water which flows into the arrangement through the feed connection 29 first flows through the hollow space 21b in the lower portion 18b of the inner wall of the housing 13, then through the space 24 defined by the bottom portion 24, and then into the space 28 defined in the outer wall, then being discharged through the discharge connection 30 at an upper peripheral location at the outside wall. FIGS. 3 and 11 show in a similar manner that the cooling water which flows into the space 31 in the cover 26 through the feed connection 32 flows at an overflow means 34 (see FIG. 3) into the space 21a in the upper portion 18a of the inner wall of the housing 13, and from that space 21a to a further overflow mens 35 (see FIGS. 3 and 11), back into the cover 26 from which it then finally flows to the discharge connection 33 of the associated cooling water circuit.

Reference will now also be made to FIGS. 4 and 6 through 11 from which it will be seen that all the hollow spaces 21a, 21b, 27, 28 and 31 in the wall members of the housing 13 include therein intermediate walls or partitioning means 36 defining coolant channels which extend in a labyrinth-like configuration, thereby to ensure that, in operation of the apparatus 11, the cooling water flows through all the above-mentioned spaces everywhere at a sufficient speed, thereby avoiding the danger of local overheating and the formation of bubbles of varpour from the cooling water at areas in the water circuit which would otherwise be substantially stagnant.

Referring now to FIGS. 3 through 5, the upper clamping means 23 comprises a plurality of and as illustrated three piston-cylinder units 38 which are each secured to a support plate 37 of the housing 13 and which are distributed uniformly around the periphery of the annular space 22 defined by the housing 13, in the upper portion of the space 22. The pistons of the respective piston-cylinder units 38 are movable inwardly radially with respect to the housing 13 and at their free end each carry a clamping jaw 39. As will be seen more particularly from FIGS. 4 and 5, each clamping jaw 39 can be advanced into the axial space 17, through a bush or sleeve 40 which is fixed in an associated hole in the upper portion 18a of the inner wall of the housing 13, while also being sealed with respect to the space 21 defined in the upper portion 18a, with the forward movement of the respective clamping jaw 39 being of such a magnitude that, when all of the three jaws 39 are moved forward at the same time, the permanent electrode 2 which, as shown in FIG. 4, is introduced with the outside shoulder 15 on its screw nipple 9 disposed precisely in the transverse plane in which the jaws 39 lie, can be gripped. As will also be seen from FIG. 5, the piston-cylinder units 38 are hydraulically actuable by means of a conduit system 41 in conventional manner, which is not shown in greter detail herein, in order to produce clamping of the permanent electrode 2 and obviously also to permit the permanent electrode 2 to be released. In actuation of the jaws 39, the jaws 39 always remain sealingly guided within the associated sleeves 40, even when the jaws 39 are in their fully retracted position, so that the annular space 22 is always effectively screened or shielded from the space 17 which is at high temperature, even at the locations in the upper portion 18a of the inner wall of the housing 13 at which the clamping jaws 39 are disposed.

Referring still to FIGS. 3 through 5, it will be seen therefrom that the lower clamping means 20 comprises a plurality of and as illustrated three clamping jaws 42 which are arranged at uniform spacings around the periphery of the annular space 22. The clamping jaws 42 project into the gap 19 between the upper portion 18a and the lower portion 18b of the inner wall of the housing 13. For the purposes of unscrewing the portion 10 of a graphite electrode which is initially still secured to the screw nipple 9, the jaws 42 must be rotated while in the clamping position, together with the electrode portion 10, and at the same time must be screwed downwardly. For that purpose, they are jointly mounted on a cylindrical rotary member 43 which extends in the axial direction beyond the gap 19, over both the upper portion 18a and the lower portion 18b of the inner wall of the housing 13. At its lower end, the rotary member 43 is guided by means of an inner guide ring 44 on the wall portion 18b, while at the top it has an internal or female screwthread 44 which engages into an external or male screwthread 45 provided at that location on the upper portion 18a of the inner wall of the housing 13. The pitch of the two screwthreads 44 and 45 is the same as the pitch of the screw nipple 9 so that the portion 10 of the graphite electrode can be unscrewed from the nipple 9 by suitable rotary movement of the rotary member 43, when the clamping jaws 42 are in a position of clamping the graphite electrode portion 10 and the permanent electrode 2 is in a position of being secured at the same time by the upper clamping means 23, engaging the outside shoulder 15 on the electrode 2. As approximately four revolutions are required for screwing tight a graphite electrode portion 10 when using screw nipple screwthreads as are conventionally employed for screwing together successive portions or sections 10 of graphite electrodes, the rotary body 43 must also be capable of being screwed through four revolutions and the width of the gap 19 must be such that the clamping jaws 42 can perform the corresponding axial movement during the screwing action. In order to produce the required screwing movement on the part of the rotary member 43, the rotary member 43 is provided at its upper end portion with an external annular tooth configuration or ring gear arrangement 46 which is engaged by a drive pinion 47 (see FIG. 5) of a reversible drive motor 49 which can be seen in plan view from above in FIG. 3 and which is secured to a further support plate 48 of the housing 13. In the embodiment illustrated, the drive motor 49 is also hydraulically actuable.

As will also be seen from FIG. 4, each jaw 42 has a piston rod 50 which extends outwardly through the rotary member 43 into the annular space 22. A sleeve 51 which is disposed concentrically around the piston rod 50 and which is secured at its inward end to the rotary member 43 carries at its outward end portion an inner guide sleeve or bush 52 for the piston rod 50. An elongate resilient means in the form of a coil spring 53 has one end braced against the guide bush or sleeve 52, and is disposed around the piston rod 50. The other end of the coil spring 53 bears against an outside shoulder configuration 54 on the piston rod 50, thereby to bias the piston rod 50 and thus the clamping jaw 42 continuously inwardly towards the space 17, with a given clamping force which is sufficient to grip a graphite electrode.

The working range of the reversible drive motor 49 is such that it can screw the rotary member 43 from a particularly determined initial angular position just through precisely four revolutions or an integral multiple of the angular spacing of the clamping jaws, so that, after the corresponding axial screwing movement of the piston rods 50, the piston rods 50 once again assume precisely the same angular position, more particularly in both directions of screwing movement. By virtue of this arrangement, before and after each screwing operation, the clamping jaws 42 can be retracted radially outwardly relative to the housing 13 from their clamping positions as illustrated, such retraction movement being produced by means of grooves 55 or slots which extend with their axis parallel to the axis of the housing 13 and which are provided at the outer ends of the respective piston rods 50, as will be seen from FIGS. 4 and 5, and by means of a respective wedge or taper member 57, as shown also in FIG. 4.

Reference should also be made to FIGS. 4 and 5 to ascertain the manner in which each taper member 57 is movable downwardly and can be retracted again, in a line of movement parallel to the axis of the housing 13, from the initial position illustrated for example in FIG. 4, by guide means 58 disposed above the piston rods 50 and mounted to the housing 13. In that arrangement, each taper member is operated by a respective piston-cylinder unit 59 which is operatively engaged to the upper end of the respective taper member 57 and which has its cylinder secured to the housing 13. The piston-cylinder unit 59 is also actuated hydraulically.

So that the annular space 22 and in particular the interengaging female and male screwthreads 44 and 45 at the upper end portion of the rotary member 43 remain protected from dust and fouling material from the axial space 17 in the housing 13, in spite of the rotatability of the rotary member 43, the annular gaps between the rotary member 43 and the two inner wall portions 18a and 18b, which are to be found both above and below the gap 19, are each sealed off by means of a split packing box or gland 60.

Reference will now be made generally to FIGS. 1 through 6, showing that at one side the housing 13 is also provided with a frame attachment assembly 61. From the underside thereof, two runners or skids 62 extend under the bottom portion 24 of the housing 13, on respective sides of the axial space 17 in the housing 13 for receiving the electrode. The assembly 61 can be used as desired to secure the apparatus 11 to a manipulator or the like carrier arrangement, while the runners or skids 62 form support feet for protecting the housing 13.

It will be readily apparent from the foregoing description that the residual portion 10 of a graphite electrode, which is introduced from the permanent electrode 2 into the space 17 in the housing 13 can then be gripped firmly by the jaws 42 on the rotary member 43, by the taper members which are initially disposed in their downward limit position in which they engage into the slots 55, being raised by actuation of their respective piston-cylinder units 59 upwardly out of the slots 55 into the release positions as shown in FIG. 4. Thereupon, with the permanent electrode 2 secured by the upper clamping means 23 and the outside shoulder 15 on the screw nipple 9, the rotary member 43 can be screwed downwardly through precisely four revolutions, so that the electrode portion or section 10 is unscrewed from the screw nipple 9. The taper members are now moved downwardly again from their release positions shown in FIG. 4 into the slots 55 whereby the jaws 42 are retracted to release the electrode portion 10 which drops down, for example into a suitable receiving vessel or container. A fresh portion or section of a graphite electrode is now introduced by means of a conventional manipulator or like apparatus upwardly into the space 17 until it comes to bear against the screw nipple 9 on the permanent electrode 3. Thereupon, the taper members 57 are retracted upwardly again into their release positions as shown in FIG. 4 so that the fresh electrode portion 10 is now axially clamped, at the rotary member 43. Operating the drive motor 49 again causes the rotary member 43 to be screwed back up through precisely four revolutions, although in general it is not necessary to perform the full four revolutions in order to tighten an electrode portion or section in position. As the jaws 42 only exert a limited gripping pressure on the electrode portion 10, by the force of the springs 53, the rotary member 43 can nonetheless be screwed up by the full four revolutions after the electrode portion 10 is finally firmly screwed in position, with the jaws 42 then merely sliding over the surface of the electrode portion 10, over a corresponding distance during the last part of the screwing motion.

Finally, the substantially consumed electrode portion 10 which has previously been removed from the electrode 2 can be screwed back on to the electrode, more particularly to the lower end of the fresh electrode portion 10, to permit the virtually completely consumed electrode 10 to be finally totally consumed. For that purpose, the electrode 2, together with the fresh graphite electrode portion 10, is firstly raised by means of the top hook 5, with the clamping means in their release positions, until the fresh graphite electrode portion, with a conventional graphite or carbon screw nipple screwed on to the lower end thereof, is in approximately the same position as that shown in FIG. 4 in respect of the screw nipple 9 on the electrode 2. Thereupon, the remaining portion 10 of the graphite electrode can be screwed up on to the lower end of the fresh electrode portion 10 which has already been joined to the electrode 2, in the same manner as the fresh electrode portion 10 was screwed on to the screw nipple 9, as described hereinbefore.

It will be seen therefore that the above-described apparatus permits a graphite electrode to be connected by nipple means to a permanent electrode, from below, while the permanent electrode is still in a hot condition, while the housing protects the clamping means disposed therewithin and also provides a cooling effect by virtue of its double-walled construction.

Various modifications and alterations may be made in the above-described apparatus and method of operation thereof, without thereby departing from the scope and spirit of the present invention.

What is claimed is:

1. Apparatus for connecting a graphite electrode from below by nipple means to a permanent electrode which is axially displaceably carried by a carrier device of an electric furnace and which carries a residual portion of a consumed graphite electrode on a lower screw nipple, comprising a housing which is disposed around the permanent electrode in the region of the screw nipple and the adjoining portion of the graphite electrode, an upper clamping means disposed in the upper region of said housing, for gripping the permanent electrode, and a lower clamping means disposed in the lower region of the housing, the lower clamping means being adapted for screwing through a total movement of more than one revolution in an axial region permitting a graphite electrode to be disconnected from and connected to the nipple means on the permanent electrode, the housing having a cylindrical inner wall around an axial space for receiving the electrode assembly, the cylindrical inner wall being closed except for the openings required for the clamping means and being of a double-walled construction, the hollow space defined by the double-walled construction being connected to a coolant supply.

2. Apparatus as set forth in claim 1 wherein the inner wall is also the inner wall of an annular space which is defined in the housing, said annular space being sealed in an outward direction and accommodating the upper and lower clamping means.

3. Apparatus as set forth in claim 1 wherein the housing comprises outside and end wall portions which are of a double-walled construction and which are connected to a cooling system.

4. Apparatus as set forth in claim 2 or claim 3 wherein the housing is releasably composed of a lower housing part which is formed from a bottom portion, an outer wall portion and a portion of said inner wall, which is disposed below said lower clamping means, and an upper housing part which is formed from a cover and a portion of said inner wall, which is disposed above the lower clamping means.

5. Apparatus as set forth in claim 4 wherein said upper housing part and said lower housing part each form a respective cooling system each provided with a feed connection and a discharge connection.

6. Apparatus as set forth in claim 1 wherein each hollow space which is defined within a double-walled construction of the housing and which is connected to a cooling system includes partitioning means therein to form a cooling duct.

7. Apparatus as set forth in claim 1 wherein said upper clamping means comprises clamping jaws which are sealingly guided in suitable bushes in the inner wall of said housing.

8. Apparatus as set forth in claim 1 wherein said upper clamping means comprises clamping jaws which are each hydraulically actuable by means of a respective piston-cylinder unit having the cylinder thereof secured in the housing.

9. Apparatus as set forth in claim 1 wherein said lower clamping means comprises clamping jaws which are guided displaceably radially relative to the housing in a rotary member which is disposed around said inner wall and which is fluidtightly guided thereon on both sides of an annular gap provided in said annular wall, said rotary member having a female screwthread engaging into a male screwthread provided on said inner wall, and the rotary member further comprising an outer ring gear means engaging with a drive pinion of a reversible drive motor which is disposed at a fixed located in the housing.

10. Apparatus as set forth in claim 9 wherein said drive motor is hydraulically actuable.

11. Apparatus as set forth in claim 9 or claim 10 wherein the lower clamping means comprises clamping jaws which are biassed into their clamping position by a respective spring means arranged on the rotary member, and further comprising taper members which are disposed in the housing at the same angular positions as the clamping jaws and which are each guided in the housing for movement in a direction parallel to the axis of the electrode assembly, each said taper member being displaceable in both limit positions of the respective clamping jaws, for radial retraction movement of the clamping jaws from the graphite electrode portion, against the force of said spring means.

12. Apparatus as set forth in claim 11 wherein said taper members are hydraulically displaceable by means of respective piston-cylinder units which each have their cylinder mounted in the housing.

13. Apparatus as set forth in claim 1 wherein said housing carries a projecting frame attachment means at an outer peripheral location thereon.

14. Apparatus as set forth in claim 1 wherein said housing has two skid means on its underside.

15. Apparatus for connecting a graphite electrode portion to the lower end portion of a permanent electrode in an electric furnace, comprising: a housing adapted to be operatively disposed around the lower connecting end portion of said permanent electrode, the housing including an at least substantially cylindrical inner wall means defining an axially extending space for receiving said electrode, said inner wall means being of a double-walled construction thereby to define a space within said wall means; means for connecting said space within said wall means to a coolant supply means; a first clamping jaw means disposed in said housing and adapted to grip said permanent electrode in an operative position of said first clamping jaw means; a second clamping jaw means disposed in said housing and adapted to grip a said graphite electrode portion adapted to co-operate with said permanent electrode, said second clamping jaw means also being rotatable as an assembly relative to said first clamping jaw means for screwing and unscrewing a said graphite electrode portion gripped thereby to and from said permanent electrode; and means for rotating said second clamping jaw means over at least one revolution, for producing said screwing and unscrewing motion of said graphite electrode portion.

16. Apparatus as set forth in claim 15 wherein said means for rotating said second clamping jaw means comprise a rotary member rotatably mounted on said inner wall and carrying said second clamping jaw means.

17. Apparatus as set forth in claim 15 wherein the space defined within said housing outwardly of said inner wall means is substantially sealed to prevent ingress into the housing of fouling matter.

18. Apparatus as set forth in claim 16 wherein said first and second clamping jaw means and said rotary member are actuable by hydraulic means.

* * * * *